United States Patent [19]

Corby, Jr.

[11] Patent Number: 4,491,719
[45] Date of Patent: Jan. 1, 1985

[54] LIGHT PATTERN PROJECTOR ESPECIALLY FOR WELDING

[75] Inventor: Nelson R. Corby, Jr., Scotia, N.Y.

[73] Assignee: General Electric Company, Schenectady, N.Y.

[21] Appl. No.: 451,219

[22] Filed: Dec. 20, 1982

[51] Int. Cl.³ .............................................. B23K 9/12
[52] U.S. Cl. ............................... 219/124.34; 318/577; 350/96.24; 901/9; 901/42
[58] Field of Search ................... 219/124.34, 124.22, 219/130.21; 318/577; 356/376, 377, 384, 387; 350/96.24; 901/9, 42

[56] References Cited

U.S. PATENT DOCUMENTS

| | | | |
|---|---|---|---|
| 3,619,065 | 11/1971 | Agnew | 356/120 |
| 3,757,125 | 9/1973 | Okada et al. | 219/124.34 |
| 3,800,149 | 3/1974 | Lang | 350/96.24 |
| 3,976,382 | 8/1976 | Westby | 356/376 |
| 4,158,507 | 6/1979 | Himmel | 356/376 |
| 4,349,277 | 9/1982 | Mundy et al. | 356/376 |
| 4,409,477 | 10/1983 | Carl | 350/96.24 |

FOREIGN PATENT DOCUMENTS

WO79/00004 1/1979 PCT Int'l Appl. ................ 318/577

OTHER PUBLICATIONS

S. H. Rao, CWR Technical Report 529613-81-3, Ohio State University, Sep. 1981, pp. xi, xii, 1-5, 24-41.

*Primary Examiner*—Clifford C. Shaw
*Attorney, Agent, or Firm*—Donald R. Campbell; James C. Davis, Jr.; Paul R. Webb, II

[57] ABSTRACT

Structured light patterns are introduced into the arc vicinity within the field of view of the integral optical sensor on a gas tungsten arc welding torch. Processing the image yields data needed to guide the torch and control and assess the weld process. The optical welding torch has a projector system with a remote light source and flexible fiber optic bundle over which the light pattern passes to an exit projection and relay assembly mounted on the torch. A programmable laser pattern projector, useful for other applications, has a beam deflection device that traces a two-dimensional pattern on the entrance of a coherent fiber optic bundle; no moving parts or electrical connections are needed at the terminal end. An optional modulator changes the pattern intensity spatially or temporally.

12 Claims, 8 Drawing Figures

LIGHT PATTERN PROJECTOR ESPECIALLY FOR WELDING

BACKGROUND OF THE INVENTION

This invention relates to a structured light projection system for a robotic welding torch and other tasks.

A gas tungsten arc welding torch with an integral vision sensor is described in Ser. No. 401,471, filed July 27, 1982, now abandoned, and continuation application Ser. No. 619,432, filed June 11, 1984, A. W. Case, N. R. Kuchar, and D. C. Peroutky. The center of the torch is cleared and the lens of the built-in optical system is over the tungsten electrode. The image of the weld puddle and weld area is transmitted by a fiber optic bundle to a video camera and hence to a controller. The inventor's concurrently filed application Ser. No. 401,473, now U.S. Pat. No. 4,450,339 discloses a molybdenum sleeve on the electrode which blocks light from the intensely bright arc and improves the image.

The major goal in visually guided welding is the production of high quality welds automatically. To this end, information is needed from the vicinity of the arc. To produce a quality weld, the positioning system must progress along the joint to be welded such that the puddle remains centered over the joint. Some commercial systems exist that track the joint well in front of the torch electrode. Some are mechanical, use scene analysis or structured light analysis, but none function in the vicinity of the arc and they do not utilize both puddle behavior information and joint topography information.

Computer vision processing is currently applied to many problems in inspection and robotic control. In general, the goal is to measure one or many points. If height is measured along a line directly below the sensor, a height profile is produced, and if many such parallel lines are measured a surface height map is produced similar to a topographic map for land masses. One of the ways to perform this height or range measurement using computer vision is by means of structured illumination. This is a technique which uses parallax effects to measure range. As a ray of light impinges at an angle on a surface located below a viewpoint, it creates a dot of light where it intersects that surface. As the surface moves up and down, toward and away from the viewpoint, the apparent position of the dot translates back and forth. This translation can be measured and height calculated. A sheet of light can be used producing a line instead of a point.

Central to this technique is the creation of patterns of light and their delivery to remove areas which may be cramped or hazardous. Three-dimensional inspection techniques frequently require that light projectors and sensors be moved through space by a robot, thus requiring that the projector is lightweight, as small as possible, and have no moving parts.

In robot welding systems, it is necessary to adaptively control the welding torch position as the robot moves the torch along the joint to be welded. Computer vision has begun to be applied to this problem. Normally, the vision system of the above GTAW torch is expected to supply information as to the torch electrode position relative to the joint and information about the position and condition of the molten weld pool relative to the electrode. For determining joint position and the topography of the plates to be joined, structured illumination is employed. The light projector must be sealed, bright, well focused, very compact, and require no moving parts.

Portable, relatively compact projector systems resembling small slide projectors have been built. They carry the light source, mask, and lens around, and are fairly bulky, have limited optical power, and require power lines, cooling power, and fans while still producing a static pattern. A light emitting diode (LED) has been used as a light source, whose image is caused to move by rotating mirrors, etc. This approach will generally produce a single line of light of limited optical power. A time varying, programmable pattern is not produced by these techniques.

SUMMARY OF THE INVENTION

When additional light energy patterns are introduced into the vicinity of the arc established by a welding torch with an integral puddle view optical system, processing the scene will yield the two types of data needed to guide movement of the torch, control the weld parameters, and assess the quality of the weld. It will characterize the molten puddle behavior and characterize the topography of the workpiece, joint, puddle, and remelt zone.

The electric arc welding torch is provided with a projector system which has a remote light source and an exit optical assembly on the torch that projects a structured light pattern onto the work within the field of view of the viewing optical system. The structured light pattern is, for instance, a plurality of thin, parallel, widely spaced light stripes. At least two light stripes focused on the workpiece and joint ahead of the puddle provide, after processing the image, transverse profiles and navigational information. Light stripes are projected onto the weld puddle to provide information on its shape, extent, and position to control the welding process, and onto the remelt zone to yield information for post-weld quality analysis. A large pattern covering all three areas may be used to acquire all three types of data simultaneously. The energy of the light source is discriminated from that of the arc as by putting a frequency selective filter in the optical path.

A static pattern results by passing light through a mask at the entrance of a coherent fiber optic bundle and at the terminal end a lens projects the pattern onto the target surface. It is preferred, however, to have a programmable laser pattern projector; this has utility for other tasks such as surface defect detection. A light source, generally a laser, forming a narrow beam optionally is passed through an intensity modulator and then into a beam deflector. An input lens system images the deflected beam onto one face of the coherent fiber optic bundle. An exit projector and relay optical assembly, attached to the torch in the robotic welding application, focuses the structured light pattern onto the target surface. The beam deflector, and optionally the modulator, are controlled by a computer or other source of x, y data and the remote beam is caused to follow that path. The modulator changes the pattern intensity spatially or temporally. Any pattern and sequence of patterns may be created and projected remotely without moving parts and electrical connections at the terminal end.

DETAILED DESCRIPTION OF THE INVENTION

Figure 1:
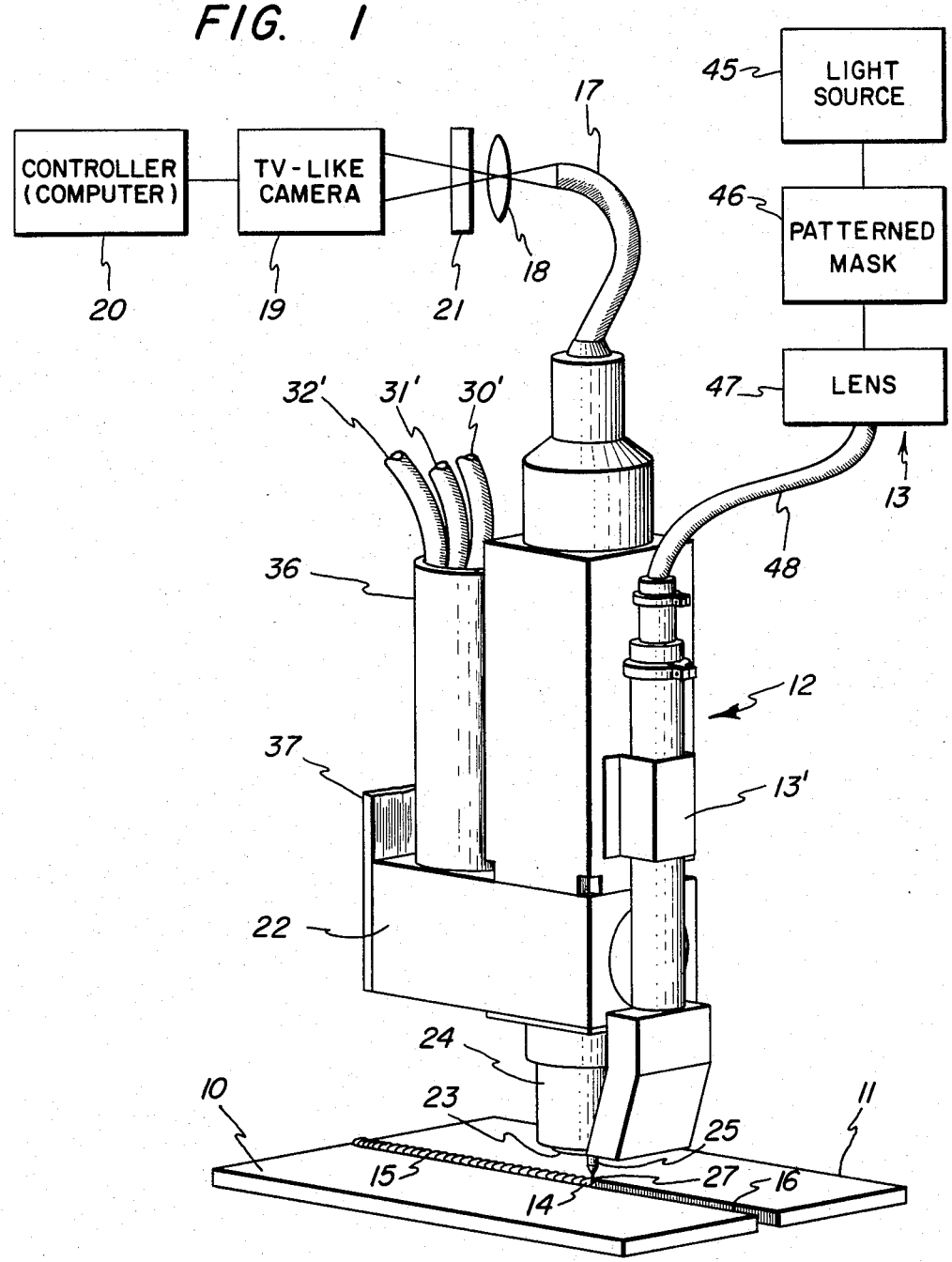
FIG. 1 shows seam welding with a gas tungsten arc welding torch which has a light pattern projector and vision sensor connected to remote components by fiber optic cables.

In FIG. 1, seam welding of workpieces 10 and 11 is illustrated using a gas tungsten arc welding (GTAW) torch 12 that has a built-in puddle view optical system and to which is attached a projection housing 13' containing the exit optical system of a structured light pattern projection system indicated generally at 13. The weld puddle 14, part of the remelt zone 15, the joint 16 between the workpieces immediately ahead of the weld puddle, and the structured light pattern, typically several parallel lines, are imaged on the face of a coherent fiber optic bundle 17 by which the image is transferred to a remotely located camera and welding controller. The image is magnified by a lens system 18 and relayed to a television-like camera 19 such as General Electric's TN 2500 Charge Injection Device Camera, or a vidicon, etc. The video output is fed to a computerized controller 20 and used in a feedback arrangement to guide motion of the torch and to control the welding process to achieve consistently good quality welds. Optionally, an optical filter 21 is in the camera optical path.

Figure 2:
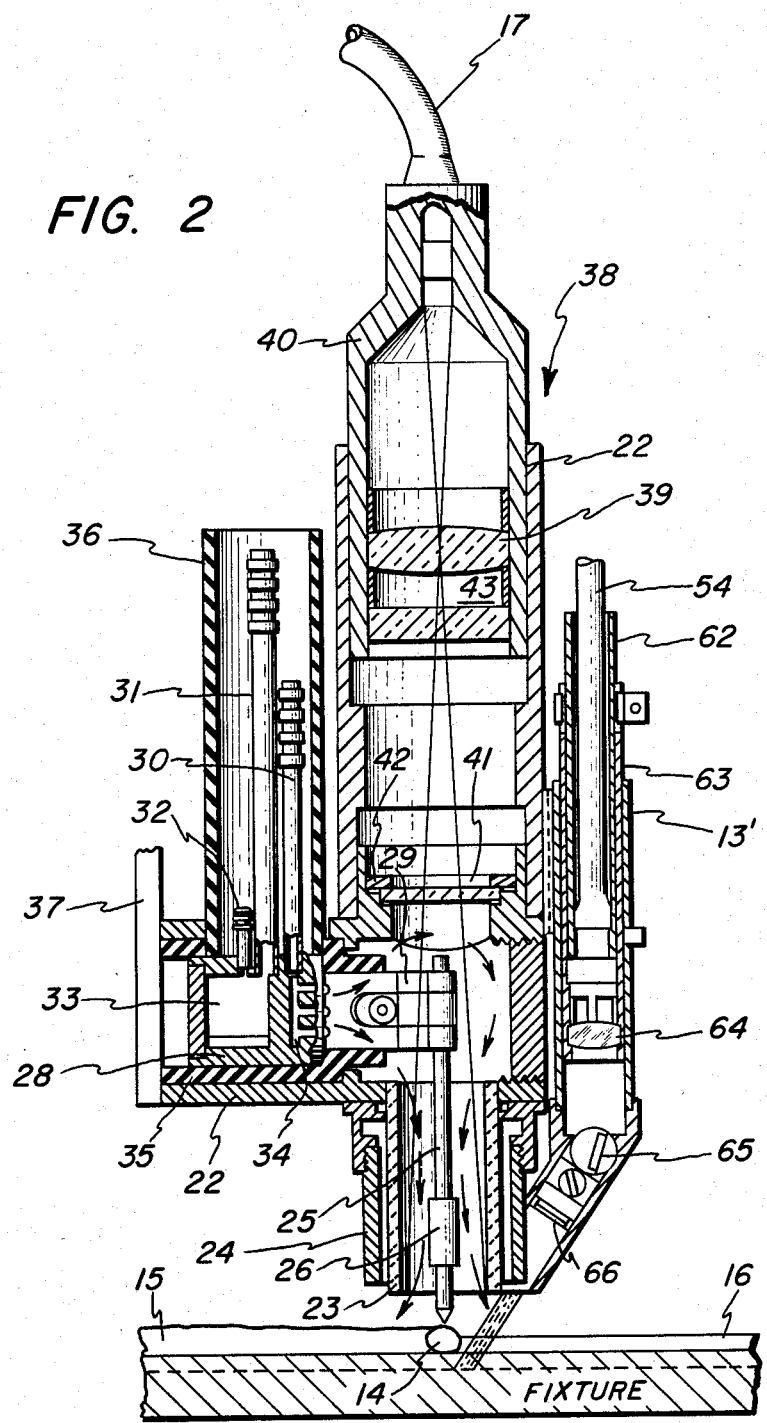
FIG. 2 is a vertical cross section through the optical welding torch and projector attachment.

One configuration of the optical torch is shown in FIG. 2 and is described briefly. It can be employed for welding in almost all applications in which a conventional gas tungsten arc welding torch is used. At the lower end of metal housing 22 is a cylindrical ceramic gas cup or nozzle 23 which is surrounded by a metal cup 24. The replaceable tungsten electrode 25 is at the center of the gas nozle and on it is a molybdenum sleeve 26 that serves as an image block and eliminates distortions caused by the presence of portions of the intensely bright electric arc 27 (FIG. 1) established between the electrode and the workpiece. The water cooled copper torch body 28 has an integral slim profile electrode holder 29 and gas, water, and electrical power connections 30—32. For a compact configuration, the torch body and slim profile electrode holder position the electrode 25 on the optical centerline, and the gas, water, and electrical connections emerge close to and parallel with the optical system. The three-part electrode holder 29 provides for a minimum cross section perpendicular to the optical axis consistent with holding the electrode securely and providing adequate conduction area for, say, a 200 ampere electrode current flow. The cylindrical torch body 28 has an interior water chamber 33 with a central baffle to provide maximum contact of water with the torch body and optimum cooling of the assembly. Cover gas flows into a separate passage 34 and out through orifices to the interior of the welding torch and hence through gas nozzle 23 to protect the electrode and weld puddle from atmospheric contamination. The cover gas is usually an inert gas such as argon or a mixture of inert gases. Slim profile copper electrode holder 29 is a projecting arm or chuck having a ring at the end of the arm into which the tungsten rod electrode 25 is inserted; the upper and lower arms of the holder are stationary and integral with torch body 28, and the center armm is movable to clamp the electrode and permit changing of electrodes. A sleeve 35 electrically insulates the torch body 28 from metal housing 22 and provides sufficient flashover distance to prevent arcing during high voltage weld arc starting. An insulating tube 36 encloses the gas, water, and power connections. The gas supply line 30' (FIG. 1), water line 31', and water/power cable 32', plus the fiber optic bundle 17, are made to exit away from the weld area. A mounting bracket 37 attached to housing 22 permits mounting the optical welding torch 12 to any available mounting configuration, such as the wrist or arm of a robotic machine.

The torch's integral optical system is indicated at 38. Triplet lens system 39 is mounted inside a lens housing 40 that can be moved axially to focus on the weld spot for a reasonable range of electrode extension beyond gas cup 23. The optical axis is approximately aligned with the center of the gas cup and with tungsten electrode 25. The optical path penetrates the quartz window 41 which seals the optics from the cover gas; this transparent, heat reflecting window is retained in the housing by a ring 42. A filter region accommodates one or more optical filters 43 which are either selective transmission filters or neutral denisty filters. The energy which passes through the filter is appropriate to the sensor characteristics and the task. Lens housing 40 contains a cylindrical cavity which holds the end face of coherent fiber optic cable 17 on the optical axis; the image picked up at one end of the bundle is transmitted faithfully to the other end. Electrode holder 29 is located sufficiently far from the optical focus region at the weld puddle and weld region to provide minimum optical distortion on the face of the fiber optic bundle. Blocking device 26 shields the electric arc from being imaged and improves the image generated by the torch-vision system. More information is given in the identified copending applications, both assigned to the assignee of this invention, and a concentric configuration and one with a folded vision attachment are described.

When additional light energy patterns are introduced into the arc vicinity, processing the scene will yield the two types of data needed to guide, control, and assess the weld process. It will characterize the molten puddle behavior and characterize the topography of the workpiece, joint, weld puddle, and remelt zone. A structured light pattern in the field of view of the integral optical system containing the weld puddle can be processed to yield: (1) three-dimensional characterization of joint, puddle, and remelt zone; (2) navigational information to control the position and velocity of a robotic welding system; and (3) process parameters such as weld penetration, remelt zone characteristics, and overall indications of weld quality. Thus, analysis of the structured light pattern can yield three-dimensional and process data, while processing of the puddle part of the scene can yield weld behavior data.

Figure 3:
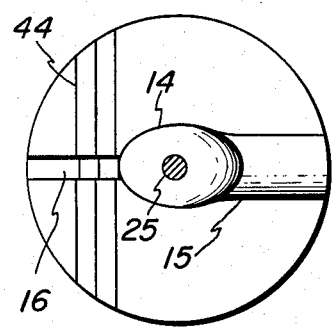
FIGS. 3–5 show the field of view of the optical system and a projected pattern of light stripes to gain information on plate topography, puddle topography, and remelt zone topography.
Figure 4:
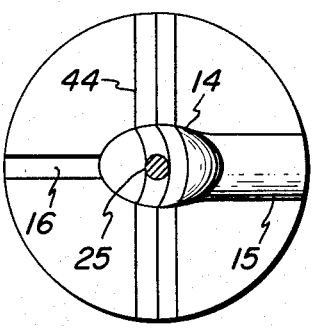
Figure 5:
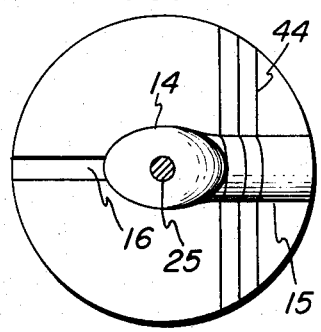

FIGS. 3–5 show the field of view of the integral vision sensor 38 and the optical welding torch. The position of tungsten electrode 25 is illustrated, at or near the center of the weld puddle 14 and nominally close to the center of the weld region that is imaged. The structured light pattern in FIG. 3 is a set of three thin, widely spaced, parallel light stripes 44 within the field of view, focused on the workpiece and joint 16 just ahead of the weld puddle 14. Based on the parallax effect previously discussed, processing the image gives a set of transverse profiles and navigational information to control motion of the welding torch. Knowledge of the plate topography close to the weld puddle is gained leading to more accurate navigational information because changes in the joint profile caused by heat, etc., are accounted for. In FIG. 4 three parallel light stripes 44 are focused by the light pattern projection system onto the weld puddle 14 and workpiece to either side to gain three-dimensional information about puddle topography. From the transverse profiles such information as pool height and width, the edge of the pool, and its shape, extent and orientation is determined. This data is utilized by the computer, for instance, to control the weld parameters, current and voltage, and to adaptively control the extent and position of the puddle. The shape of the pool is indicative of penetration and weld quality. In FIG. 5, three parallel light stripes 44 are focused onto the remelt zone 15 just behind the weld puddle to provide transverse profiles for post-weld quality analysis. The type of solidification that occurs may be detected and analyzed. A larger pattern covering all areas may be used to yield all three types of information simultaneously.

The light pattern projection system 13 in FIG. 1 projects a static pattern onto the surface of interest. A laser, incandescent lamp, or other source 45 sends light to a patterned mask 46, such as a fixed photographic optical mask. The light pattern is focused by a lens system 47 onto the entrance surface of a coherent fiber optic bundle 48. At the terminal end (see also FIG. 2), a lens system projects the pattern onto the workpiece in the vicinity of the arc. This approach achieves fairly high light power levels, but gives a static pattern. A frequency selective optical filter such as a bandpass filter is placed in the camera's optical path. If a laser is used for illumination, then a narrowband filter 21 tuned to the passband of the laser is employed. This filter passes light at the laser frequency and attenuates light at other frequencies. It is realized that some provision must be made to discriminate the energy of the light source from the energy of the electric arc. Alternatively, filter 21 may be a neutral type or a type that enhances the camera performance, for example, a 900 nanometer bandpass filter for a CID silicon-type solid state imager. Reviewing, the image is then processed by two or more procedures. First, the area around the electrode is processed by computer to yield information about the puddle perimeter, shape, orientation, position, etc. This information is passed along to the control computer 20. Secondly, the pattern of structured light can be used to gain three-dimensional information about weld region topography. The topographic information is also passed along to the central computer for control. The visually sensed data is used to alter the weld path, control weld parameters, and assess weld quality.

Figure 6:
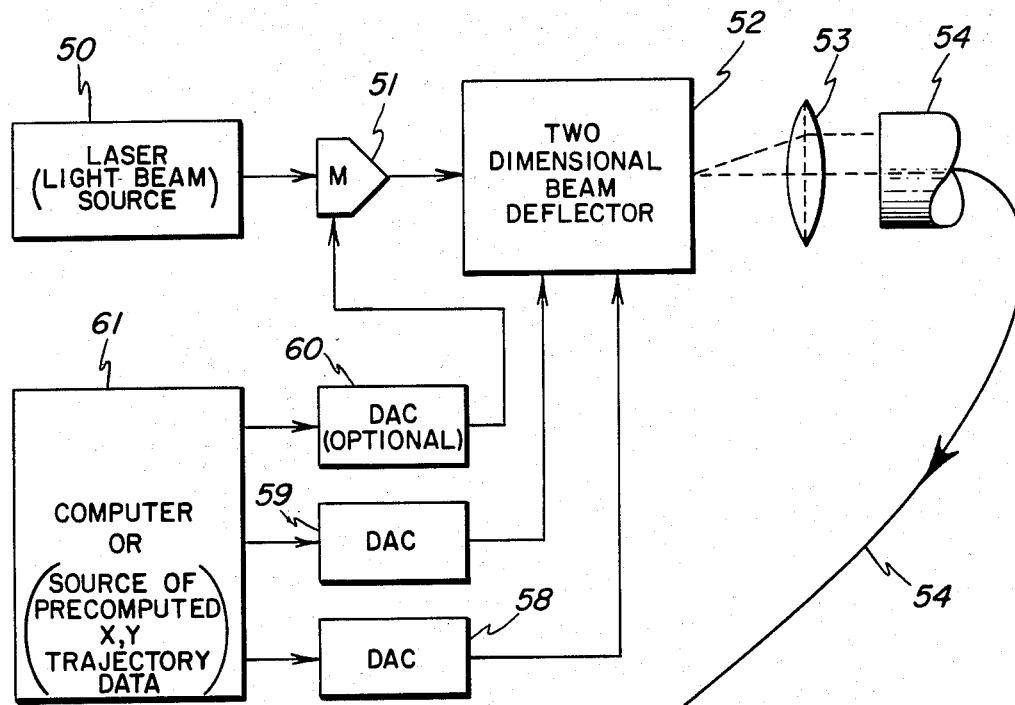
FIG. 6 is a diagram, partly in cross section, of the programmable laser pattern projection system.
Figure 6:
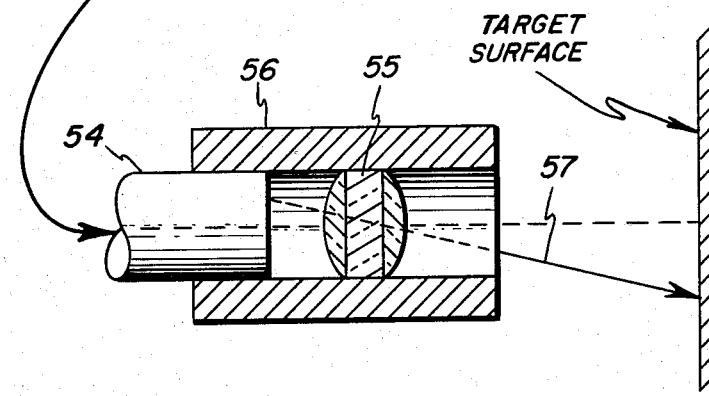

A time varying, programmable pattern is produced by the programmable laser pattern projector in FIG. 6, which has utility in visually guided tungsten inert gas (TIG) and metal inert gas (MIG) welding, and for other tasks such as surface defect detection and dimensional measurement. A light beam source, generally a laser 50 such as a continuous wave helium-neon laser or a CW laser diode, forming a narrow beam is optionally passed through a beam intensity modulator 51 and then into a two-dimensional beam deflector 52. The deflector can be of the electro-optical type or can be a pair of rotatable mirrors, each driven by a precision galvanometer mechanism. One of the latter, sold by Frequency Control Products, Inc., Woodside, N.Y., is the Type ALS-PS Scanner in an X-Y Mount. The goal is to deflect the beam angularly by angles $\alpha$ and $\beta$, spatially by amounts x and y. The intensity modulator 51 provides a programmable way of spatially or temporally changing the pattern intensity. The deflected beam is imaged by an input lens system 53, at a suitable demagnification, onto the entrance of the coherent fiber optic bundle 54. This decreases the spot size, which gives a finer projected pattern. The narrow light beam is deflected spatially to trace out a designated light pattern on the face of the fiber optic bundle. After passing along the coherent fiber bundle, up to 10–15 feet long, the deflected beam exits the fiber bundle and is imaged by an output lens system 55 onto the target surface to be patterned. A projection housing 56 holds the exit end of the fiber bundle and is a mount for the projection lens. Magnification of the projected pattern is adjusted by lens system 55.

The deflection system 52 and optionally the modulator 51 are driven by the output of digital-to-analog converters 58–60 which in turn are supplied with digital data by a computer 61 or by a source of precomputed x,y trajectory data. Thus, a program in the computer can calculate a path and cause the remote beam to follow that path at rates limited only by the bandwidth of the deflection mechanism.

FIG. 2 shows in more detail the exit projector and relay assembly inside of projector housing 13' which is fastened to one side of the welding torch and angled inwardly and screwed to the gas cups. The end of fiber optic bundle 54 is mounted in an inside tube 62 which is slidable, in and out, relative to an intermediate tube 63 at the front end of which is carried the projection lens 64. Intermediate tube 63 is in turn slidable, in and out, inside of the housing 13'. Thus, lens 64 and bundle 54 are mounted on tubes 63 and 62 to permit relative adjustment for focusing. Fiber optic bundle 54 is also rotatable inside of its tube 62. The tilt of a mirror 65, which deflects the exit beam onto the workpiece within the field of view of the puddle view optical system, is adjustable. A quartz window 66 seals the optics from the cover gas. The angle between the projected light pattern and the optical axis of the puddle view optical system is 34° in one welding torch that was built. The projector housing may be mounted on the welding torch at a different location, i.e., not fastened to the gas nozzle, provided there is an angle between the structured illumination and viewing optical systems and a height profile calculated by the parallax technique.

Figure 7:
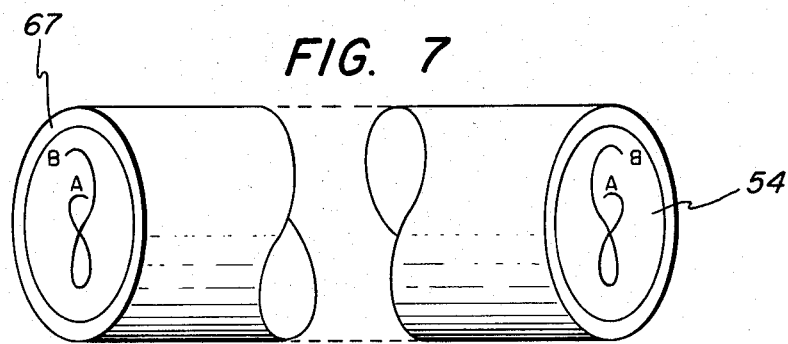
FIGS. 7 and 8 are perspective views of the entrance and exit ends of the coherent fiber optic bundle and sample light patterns traced by the laser beam which are transmitted by the bundle.
Figure 8:
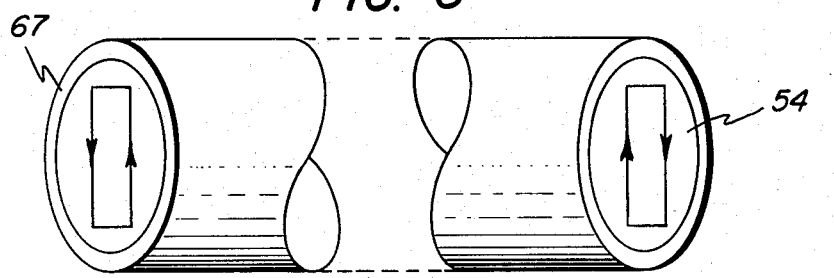

FIG. 7 depicts the entrance and exit ends of the coherent fiber optic cable 54 which has a cladding 67. The narrow light beam is deflected by beam deflector 52 and traces out on the entrance face, for example, a roughly figure eight pattern, beginning at point A and ending at B. At the exit end, the remote beam follows the same roughly figure eight path. FIG. 8 shows a closed four-sided loop pattern followed by the light beam if two parallel light stripes are desired. With reference to FIG. 3, at least two thin parallel lines are needed, projected onto the joint 16 in front of the weld puddle 14, in order to provide navigational information to control movement of the welding torch to follow the joint. It is contemplate that a structured light pattern made up of one or more circles is a better pattern for some purposes than parallel line and bar patterns. Circles of different diameters are readily formed by this projection system.

Intensity modulator 51, FIG. 6, can be directed by computer 61 to modulate the laser beam either intracycle or intercycle. One example of intracycle modulation is that there is an on-off control as a circle is traced resulting in a ring of dashes, or that the intensity is varied as a continuous circle is traced. Intercycle modulation involves, for instance, tracing a complete circle and reducing the intensity of the next circle and so on. The objective is to create a useful pattern and discriminate against the background image.

A convenient compact device is provided capable of remotely producing a ray of light whose direction in space can be precisely controlled and rapidly varied. This system allows any particular light pattern and sequence of patterns to be created and projected remotely without any mechanical moving parts and electrical connections needed at the terminal end. This is necessary for applications where a pattern of illumination is required remotely, but compactness or environmental considerations do not allow bulky lasers, deflection systems, etc. to be positioned there. This is especially the case in computer vision guided welding, and there are many other situations where this is true.

While the invention has been particularly shown and described with reference to preferred embodiments, thereof, it will be understood by those skilled in the art that the foregoing and other changes in form and details may be made therein without departing from the spirit and scope of the invention.

The invention claimed is:

1. A robotic welding system comprising:
   a gas tungsten arc welding torch having a tungsten electrode inside of a gas nozzle and an integral optical vision system whose axis passes through said gas nozzle;
   said torch in operation establishing an electric arc between said electrode and a workpiece having a joint to be welded, and said optical vision system having a field of view containing the weld puddle that is produced;
   a projector system which generates a programmable light pattern and is comprised of a light beam source, a first coherent fiber optic bundle, a programmable beam deflection device that traces a particular light pattern on the face of said fiber optic bundle, and an exit optical assembly on said torch comprised of means for mounting the other end of said fiber optic bundle, and a lens system to image the transmitted light pattern onto the workpiece within said field of view;
   said optical vision system providing an image on the face of a second coherent fiber optic bundle through which it is transmitted to a camera and a controller, said image containing said weld puddle, joint and remelt zone ahead of and behind said puddle, and projected light pattern.

2. The system of claim 1 wherein said light pattern is focused onto said workpiece and joint ahead of said weld puddle to yield navigational information to control motion of said welding torch.

3. The system of claim 1 wherein said light pattern is focused onto said weld puddle and workpiece to yield information on weld puddle topography and behavior and weld quality.

4. The system of claim 1 wherein said light pattern is focused onto said remelt zone and workpiece to yield information for post-weld quality analysis.

5. The system of claim 1 wherein said light beam source is a laser, and a frequency selective optical filter in the camera optical path to pass light at the laser frequency and attenuate light at the other frequencies.

6. The system of claim 1 wherein said projector system includes means for programmably modulating the intensity of the light beam from said source.

7. A robotic welding system comprising:
   an arc welding torch having an electrode inside of a gas nozzle and an integral optical vision system;
   said torch in operation establishing an electric arc between said electrode and a workpiece having a joint to be welded, and said optical vision system having a field of view containing the molten weld puddle that is produced;
   a projector system which has a remote light source and includes a coherent fiber optic bundle and means for forming a structured light pattern and focusing it on one end of said fiber optic bundle, and an exit optical assembly on said torch that holds the other end of said fiber optic bundle and projects the transmitted light pattern onto said workpiece within said field of view;
   said optical vision system providing an image of the workpiece weld puddle and surrounding weld region and projected light pattern; and
   means for transferring said image to a remote controller.

8. The system of claim 7 wherein said structured light pattern is a plurality of thin, widely spaced parallel light stripes.

9. The system of claim 7 wherein said structured light pattern is at least two thin parallel light stripes imaged onto said workpiece and joint ahead of said weld puddle to provide transverse profiles and navigational information to control motion of said welding torch.

10. The system of claim 7 wherein said structured light pattern is a plurality of thin parallel light stripes imaged onto said weld puddle and workpiece to provide transverse profiles and information on weld puddle shape and behavior to control the welding process.

11. The system of claim 7 wherein said structured light pattern is a plurality of thin parallel light stripes imaged onto said workpiece and remelt zone behind said weld puddle to provide transverse profiles for post-weld quality analysis.

12. A robotic welding system comprising:
   an arc welding torch having an electrode inside of a gas nozzle and an integral optical vision system;
   said torch in operation establishing an electric arc between said electrode and a workpiece having a joint to be welded, and said optical vision system having a field of view containing the molten weld puddle that is produced;
   a projector system which generates a programmable light pattern and is comprised of a remote light source, a coherent fiber optic bundle, means for deflecting a light beam to trace a particular light pattern on the face of said fiber optic bundle, and an exit optical assembly on said torch having means for holding the other end of said fiber optic bundle and projecting the transmitted light pattern onto said workpiece within said field of view;
   said optical vision system providing an image of the workpiece weld puddle and surrounding weld region and projected light pattern; and
   means for transferring said image to a remote controller.

* * * * *